United States Patent [19]

Kilby

[11] 3,777,067

[45] Dec. 4, 1973

[54] SYSTEM FOR DISABLING INCOMING TELEPHONE CALLS

[76] Inventor: Jack S. Kilby, 7723 Midbury, Dallas, Tex. 75230

[22] Filed: Dec. 30, 1971

[21] Appl. No.: 214,268

[52] U.S. Cl. .............................. 179/81 R, 179/18 F

[51] Int. Cl. ........................................... H04m 1/00

[58] Field of Search ........... 179/81 R, 18 F, 18 AB, 179/1 HF; 328/48, 72, 129

[56] References Cited

UNITED STATES PATENTS

| | | | |
|---|---|---|---|
| 3,673,339 | 6/1972 | Korn | 179/81 R |
| 3,248,481 | 4/1966 | Grote et al. | 179/1 HF |
| 2,481,840 | 9/1949 | Hardgrave | 179/84 C |

*Primary Examiner*—Kathleen H. Claffy
*Assistant Examiner*—Alan Faber
*Attorney*—Harold Levine et al.

[57] ABSTRACT

A system for detecting a ring signal and responding with a busy signal is disclosed. The system is under the control of the subscriber to present an open circuit condition to the central switching circuit until a ring signal is detected. Then a closed circuit condition is established and a signal duplicating the system busy signal is applied to the telephone line to give the calling party the impression that the called station is busy. The subscriber may activate the device either manually or by voice in response to a ring signal, or the device may be placed in an activated condition at any time and remain in the activated condition for a selected period of time to automatically respond to an incoming ring signal with an off-hook condition and a busy signal before an audible ring signal occurs.

12 Claims, 4 Drawing Figures

SYSTEM FOR DISABLING INCOMING TELEPHONE CALLS

This invention relates generally to telephone systems, and more particularly relates to a system for disabling a subscriber's set at the will of the subscriber in a manner to encourage a return call after a suitable delay.

There are many instances when a telephone subscriber would like to disable his telephone set to prevent incoming calls. Secretaries typically screen incoming calls for busy executives in an office environment. Elaborate answering systems have been devised for performing somewhat the same function in the absence of a secretary. However, each of these solutions to the problem of interruptions by telephone is relatively expensive and beyond the reach of many who would like this convenience.

One solution to the problem is to merely lift the telephone receiver from the hook prior to the ring. The system then responds to a calling party with a well known busy signal. However, the system also responds to the off-hook condition at the subscriber's set by generating a loud beep tone or a recorded voice signal audible throughout the room in which the off-hook set is located. This condition is, by design, unacceptable to a person in the room.

In accordance with the present invention, a system is provided which maintains an on-hook condition until a ring signal is detected, then responds with an off-hook condition and then a signal substantially duplicating the system busy signal. This may be done in such a manner that the calling party may not realize that it is not the busy signal normally generated by the central office when an off-hook condition is established prior to the ring signal. As a result, the calling party from time to time will replace the call until it is completed if the call is important.

In accordance with another aspect of the invention, the busy signal may be produced in response to an overt act of the subscriber after an audible ring occurs, such as pressing a button or making a noise to actuate a voice activated relay.

In accordance with another important aspect of the invention, means are provided for permitting the subscriber to select one or more periods of time during which an off-hook condition will be established in response to an incoming ring signal, before an audible ring is produced at the answering station, and a busy signal automatically transmitted.

The novel features believed characteristic of this invention are set forth in the appended claims. The invention itself, however, as well as other objects and advantages thereof, may best be understood by reference to the following detailed description of illustrative embodiments, when read in conjunction with the accompanying drawings, wherein:

Figure 1:
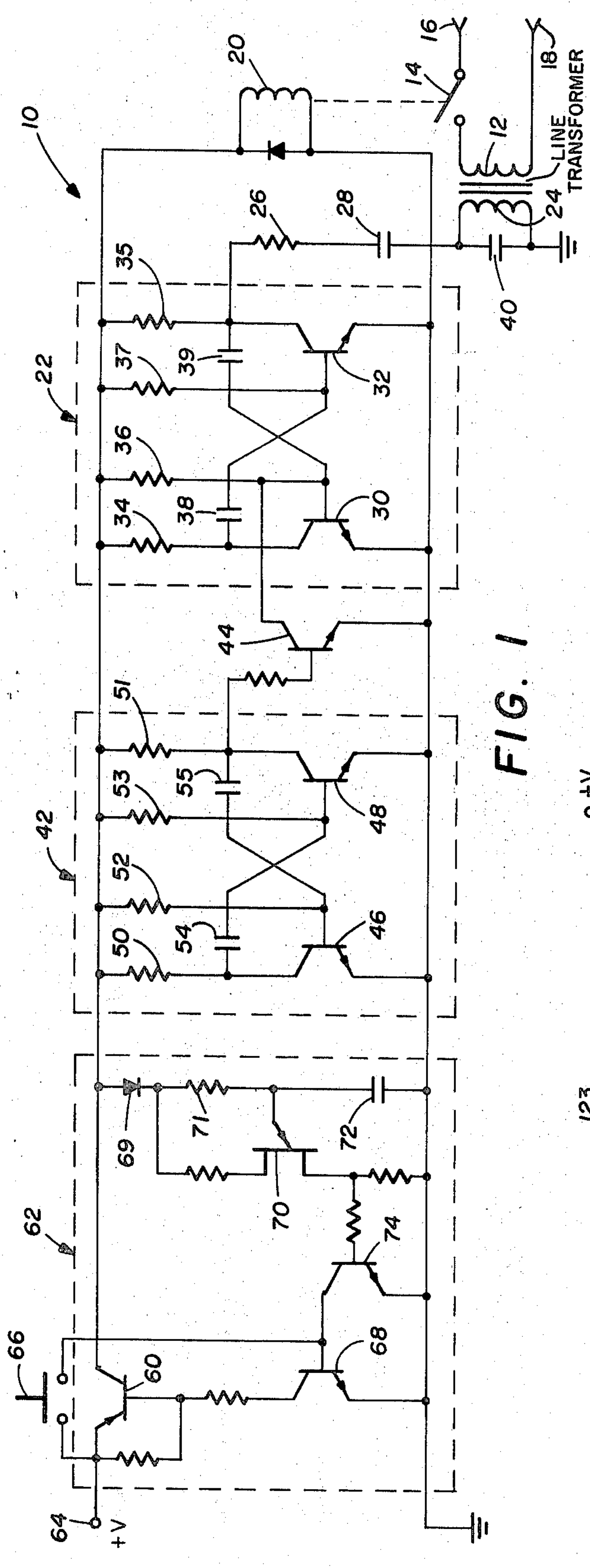
FIG. 1 is a schematic circuit diagram of a system in accordance with the present invention.

Referring now to the drawings, a system in accordance with the present invention is indicated generally by the reference numeral 10 in FIG. 1. In the system 10, the secondary winding 12 of a line transformer LT and the contacts 14 of a relay are connected in parallel with a conventional subscriber's handset by connectors 16 and 18. Since the system 10 is connected in parallel with the subscriber's handset, the handset may be used in the conventional manner at all times. The contacts 14 are normally open, thus simulating the on hook condition of the handset. The secondary winding 12 of the line transformer LT is coupled to the telephone line when the coil 20 is energized to close contacts 14. A busy signal can then be transmitted over the telephone line as will presently be described.

A busy signal tone generator 22 is coupled to the primary winding 24 of transformer LT by resistors 26 and capacitor 28. The busy signal tone generator 22 is a simple cross coupled astable multivibrator comprised of transistors 30 and 32, biasing resistors 34–37 and capacitors 38 and 39. The values of the resistors and capacitors are selected such that the tone generator 22 produces a tone having a frequency of about 150 Hz. The capacitors 38 and 39 and a capacitor 40 connected across the primary winding 24 of the transformer LT are used to shape the wave to provide the desired tone to substantially match the central switching office busy signal. By varying the values of capacitors 38, 39 and 40, different tones can be produced to match the busy signal tone to that generated by the local system.

The tone generator 22 is switched "on" for about 500 milliseconds and then switched off for about 500 milliseconds by a busy signal timing generator 42, which drives a switching transistor 44. The timing generator 42 may be of identical configuration to the tone generator 22 and may comprise transistors 46 and 48, resistors 50–53, and capacitors 54 and 55. Transistors 46 and 48 may be identical to transistors 30 and 32. Resistors 34, 35, 50 and 51 may have values of 5.6K ohms, and resistors 36, 37, 52 and 53 values of 45K ohms. However, capacitors 54 and 55 might have values of 10 microfarads compared to 0.1 microfarads for capacitors 38 and 39. Capacitors 28 and 40 might have values of 1.0 microfarads and 0.1 microfarads, respectively.

Power to generators 22 and 42, and to relay coil 20 is controlled by transistor 60 of a manually actuated, timed power switch 62. The emitter of transsitor 60 is connected to a voltage supply, typically a 9.0 volt battery represented at 64. A manually actuated switch 66, which is spring biased open, turns transistor 68 on when depressed, which in turn turns transistor 60 on. When transistor 60 is turned on, transistor 68 is turned on until such time as a unijunction transistor 70 fires as a result of a charge build up on capacitor 72 through diode 69 and resistor 71. When unijunction 70 fires, transistor 74 is turned on, which turns transistor 68 off, which turns transistor 60 off. The capacitor 72 and resistor 71 are typically sized so that the unijunction transistor 70 fires from 20 to 25 seconds after the switch 66 is manually depressed to turn transistors 68 and 60 on.

In the operation of system 10, the connectors 16 and 18 are connected to the telephone line so that the secondary winding 12 of the line transformer LT and the normally open contacts 14 are connected in parallel with the telephone handset. The contacts 14 provide an open circuit in the parallel line to simulate the on-hook condition of a telephone handset so that a ring signal from the central switching office will activate the telephone handset in the normal manner to produce an audible ring. If the subscriber is busy or does not wish to answer the telephone at that time, the normally open, manually actuatable switch 66 is momentarily depressed and closed. This connects the voltage supply 64 to the base of transistor 68 which turns on, thus turning transistor 60 on to power up the entire system 10. This also energizes the coil 20 which closes contacts 14. This produces an off-hook condition which is sensed by the central switching system so that the ring signal is terminated. Additionally, the secondary winding 12 of the line transformer LT is connected across the line to the calling party. Generators 22 and 42 are energized and begin to produce a simulated busy signal which is coupled through the transformer LT and transmitted to the calling party.

As previously mentioned, the generator 22 produces a tone having a frequency of about 150 Hz, and this tone is turned on and off by generator 42 to closely simulate the busy signal of the local system. At the same time, capacitor 72 is charged by the current through transistor 60, diode 69 and resistor 11. After a period of from about 20 to 25 seconds, the unijunction 70 fires. This turns transistor 74 on, which turns transsitors 68 and 60 off, thereby deenergizing the system. This opens contacts 14 and turns generators 22, 42 and 62 off. In the off condition, it will be noted that the circuit consumes no power, thus conserving battery life.

Figure 2:
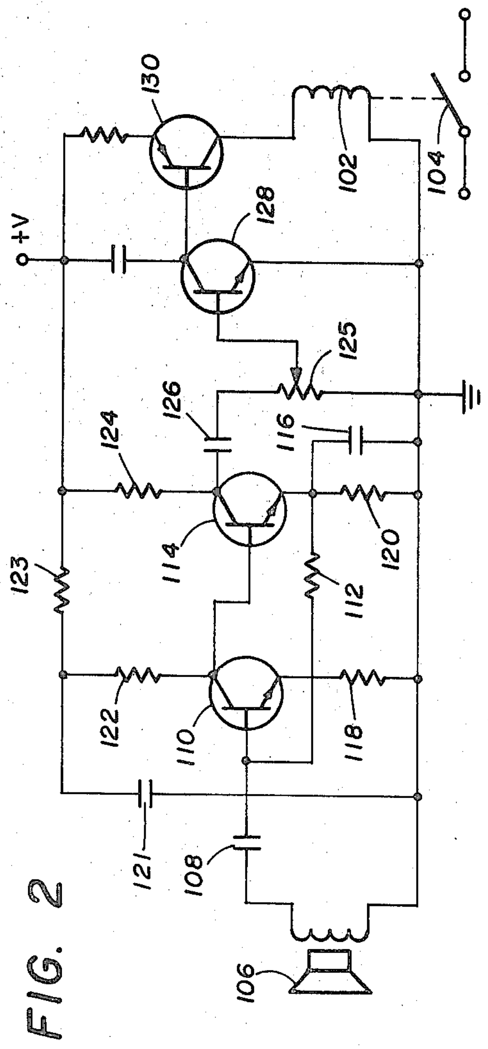
FIG. 2 is a schematic circuit diagram of a voice actuated relay which may be used in combination with the system of FIG. 1; V2

The system 10 may be modified by utilizing the voice actuated relay illustrated in FIG. 2 in place of the manually actuated, normally open switch 66. The voice operated relay has a coil 102 which controls a normally open set of contacts 104 which may be substituted directly for the switch 66 in the system 10. The coil 102 is energized in response to a suitable audible command received by a microphone 106.

The input from the microphone 106 is coupled by capacitor 108 to the base of transistor 110. The base of transistor 110 is connected by resistor 112 to the emitter of transistor 114. The capacitor 116 couples the emitter to ground. Resistors 118 and 120 connect the emitters of transistors 110 and 114 to ground, and capacitor 121 and resistors 122, 123 and 124 provide the necessary biasing network for the transistors. The network of resistors and capacitors provide the necessary filter so that only significant audible energy picked up by the microphone 106 will operate transistors 110 and 114. The output from transistor 114 is coupled by capacitor 126 and variable resistor 125 to the input of relay driver transistors 128 and 130. As a result, a spoken word or other audible command containing sufficient energy will activate the relay coil 102 and close the contacts 104 to initiate operation of the system 10 as heretofore described.

Figure 3:
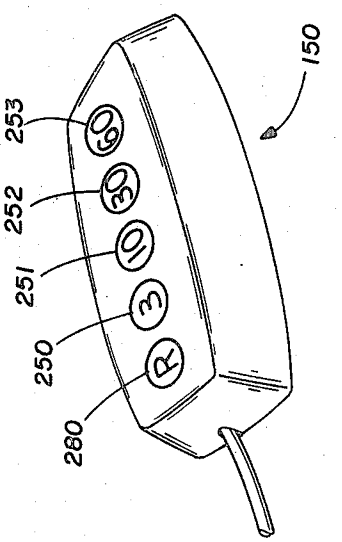
FIG. 3 is a perspective view of another system in accordance with the present invention.
Figure 4:
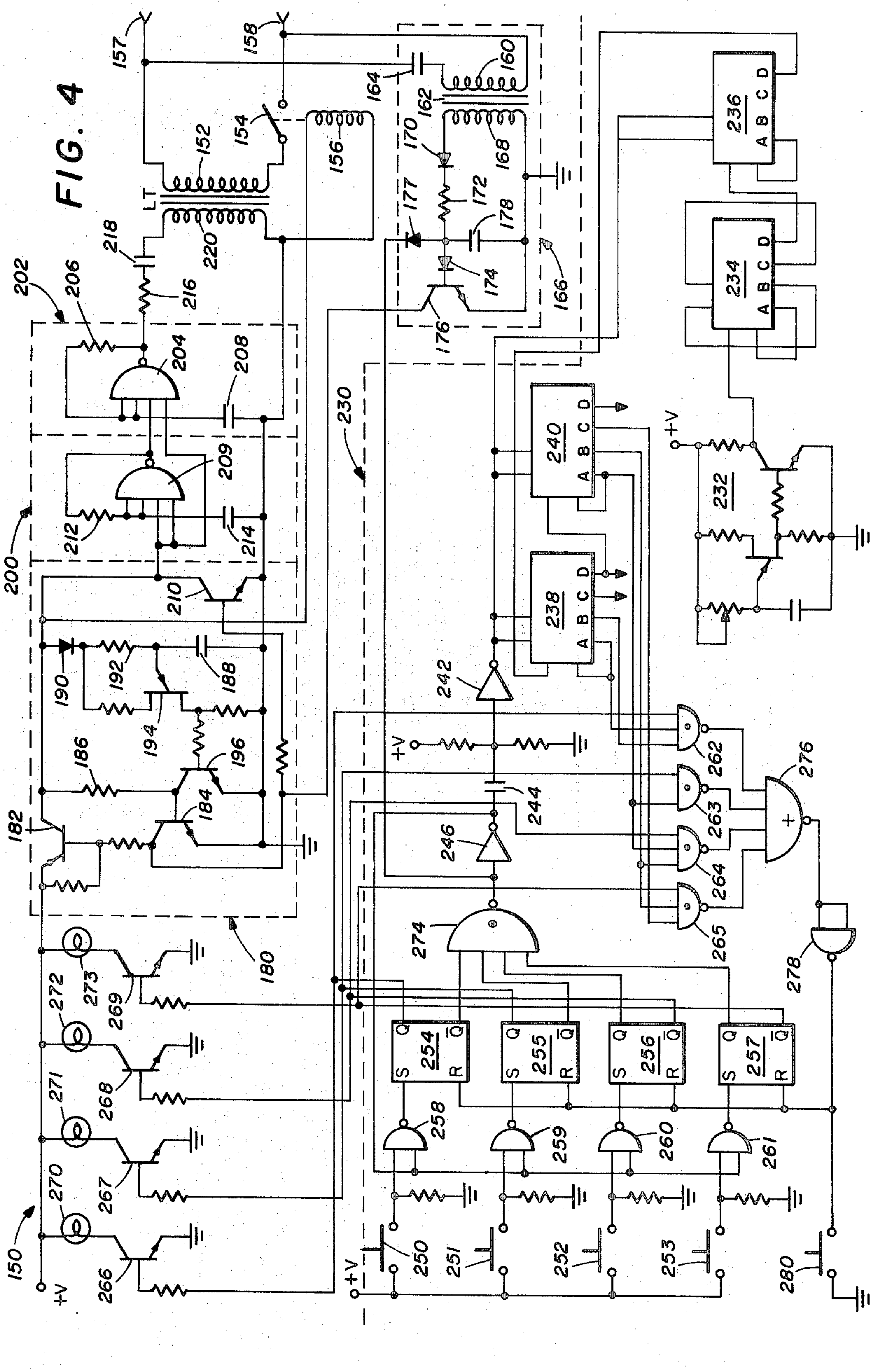
FIG. 4 is a schematic circuit diagram of the system illustrated in FIG. 3.

Another system in accordance with the present invention is indicated generally by reference numeral 150 in FIGS. 3 and 4. As illustrated in the perspective view of FIG. 3, the system 150 includes a housing having four manually actuatable switches 250–253 which are labeled 3, 10, 30, and 60, respectively, and a button 280 which is labeled R. As will presently be described, the system 150 can be selectively activated for timed periods of 3, 10, 30 and 60 minutes by momentarily depressing the respective buttons, during which activated period a simulated busy signal will be automatically transmitted to a calling party in response to an incoming ring signal. The respective button 250–253 is lighted when activated. The button 280 provides a reset function for deactivating the system.

The system 150 includes a secondary winding 152 of a line transformer LT and a normally open contact 154 of a relay 156, which may be connected in parallel across the telephone lines by connectors 157 and 158, as heretofore described. Of course, other switching devices such as a transistor may be used instead of the relay contacts 154 to establish the off-hook condition. Connectors 157 and 158 also couple the primary winding 160 of a transformer 162 of a ring detector circuit 166 across the line at all times. A capacitor 164 maintains the open circuit condition of the line necessary to maintain an open d.c. circuit for the on-hook condition so that the system 150 can receive an incoming ring signal. The secondary winding 168 of the transformer 162 is connected through a diode 170 and resistor 172 to charge a capacitor 178. The first portion of an incoming ring signal provides a voltage sufficient to turn transistor 176 on through diode 174. Diode 177 provides a logic input to enable and disable the ring detector 166 as will presently be described.

Momentary conduction by transistor 176 initiates a timed power switch 180 by turning transistor 182 on. When transistor 182 is turned on, transistor 184 is turned on by current through resistor 186, thus latching transistor 182 on. The current through transistor 182 also charges a capacitor 188 by way of diode 190 and resistor 192. When the charge has built to a sufficiently high value, unijunction transistor 194 fires, which turns transistor 196 on, thereby turning transistors 184 and 182 off. The values of resistor 192 and capacitor 188 are chosen to provide the desired time period for power to be supplied to the circuit, typically 20 to 25 seconds.

The power supplied through transistor 182 directly energizes relay 156 to close contacts 154, thereby establishing an off-hook condition and connecting the line transformer LT to the calling party.

When the timed power switch 180 is turned on, the output of an inverter stage 210 goes to a logic 1 level to enable a busy signal timing generator 200 and a busy signal tone generator 202. The generators 200 and 202 are comprised of four input NAND gates 209 and 204, respectively. Two of the inputs to NAND gate 209 are connected to the output of the inverter stage 210, and the other two inputs are connected to the output by resistor 212 and to ground by capacitor 214. Thus, when the NAND gate 209 is enabled by logic 1 level at the output of inverter 210, the NAND gate 209 functions as an astable multivibrator having a period dependent upon the values of resistor 212 and capacitor 214, which are selected to provide substantially equal on and off periods of about 500 milliseconds. One input of the NAND gate 204 is also connected to the output of the inverter stage 210. Another input of NAND gate 204 is connected to the output of NAND gate 209 so that NAND gate 204 is enabled only when both the output of the inverter stage 210 and the output of the NAND gate 209 are at logic 1 levels. The other two inputs of the NAND gate 204 are connected to the output by resistor 206 and to ground by capacitor 208 to also provide an astable multivibrator when the NAND gate is enabled by the inverter stage 210 and the NAND gate 209. The values of the resistor 206 and the capacitor 208 are selected to provide a frequency of about 150 Hz. The output circuit including the resistor 216, capacitor 218 and inductance of the winding 220 of the line transformer LT provide the necessary shaping of the square wave to achieve the desired tone and, of course, also couple the tone generator to the telephone line so that the busy signal will be transmitted to the calling party when contact 154 is closed as will presently be described.

The ring detector 166 may be selectively enabled by the subscriber for periods of 3 minutes, 10 minutes, 30 minutes or 60 minutes by the variable timing circuit indicated generally by the reference numeral 230. The timing circuit 230 includes a conventional clock source comprised of an astable multivibrator circuit 232 which produces a 1 Hz signal. The 1 Hz signal is applied to a first decade counter 234 which is connected in divide by six configuration. The output of decade 234 is coupled to the input of a second decade counter 236 which is connected in cascade with third and fourth decades 238 and 240. Decades 236, 238 and 240 are connected in divide-by-10 configuration. As a result, the second decade 236 increments the third decade 238 once each minute, and the third decade 238 increments the fourth decade 240 once each 10 minutes. Decades 236, 238 and 240 are reset by a pulse output from the inverter 242 as a result of the capacitive coupling 244 from the output of inverter 246 as will presently be described.

The four manually operable switches 250–253 are spring biased to the open position. When any one of the switches 250–251 is momentarily closed, a corresponding flip-flop 254-257, respectively, is set to the logic 1 state through the respective inverter 258–261. When any one of the flip-flops 254–257 is set to the logic 1 state, the true output Q of the respective flip-flop enables a corresponding NAND gate 262–265, and also turns on a corresponding transistor 266–269 to energize a corresponding indicator lamp 270–273. The logic 0 level in the Q output of the flip-flop 254–257 which is set to the logic 1 state produces a logic 1 level at the output of NAND gate 274 which back biases diode 177 and thereby enables the ring detector 166. When the output from NAND gate 274 transitions positive, the negative transition from inverter 246 is capacitively coupled to the input of the inverter 242 which produces a positive going pulse to reset decades 236, 238 and 240.

The outputs of decades 238 and 240 are decoded by NAND gates 262–265 to produce a logic 0 level at the respective output on a predetermined count. The logic 0 level is inverted by NOR gates 276 and by inverter 278 to reset the flip-flops 254–257. A manually operable reset switch 280 is also provided to reset the flip-flops 254–257. In the typical embodiment illustrated, the gates 262–265 decode the counts of three, 10, 30 and 60, respectively, of the decades 238 and 240 so as to provide periods of 3, 10, 30 and 60 minutes, respectively, during which the ring detector 166 is enabled. Of course, it will be appreciated that any number of time intervals of any desired duration can be provided. Alternatively, the electronic timer 230 may be replaced by a mechanical one of the clockwork variety.

In the operation of system 150, the connectors 157 and 158 are coupled to the telephone lines so that the secondary winding 152 and switch contacts 154 are connected in parallel with the subscriber's set. Assuming that the subscriber has not elected to place the system 150 in operation, all of the flip-flops 254–256 are set to the logic 0 state so that the Q outputs are all at a logic 1 level and the output of NAND gate 274 is at ground. This disables the ring detector 166 by preventing a positive charge from being stored on capacitor 178 as a result of an incoming ring signal. Thus, any incoming ring signal will produce an audible ring at the subscriber's set in the conventional manner.

Assume now that the subscriber wishes to disable his telephone for a period of 30 minutes. The subscriber momentarily depresses switch 252 to set flip-flop 256 to the logic 1 state. The Q output of flip-flop 256 goes to a logic 1 level. This enables NAND gate 264 and turns transistor 268 on to light indicator lamp 272, thus indicating that the system 150 is activated for the 30 minute period. At the time that the flip-flop 256 is set to the logic 1 state, the Q output goes to a logic 0 level, which produces a logic 1 level at the output of NAND gate 274. This logic 1 level back biases the diode 177 to enable the ring detector 166. The logic 1 level at the output of NAND gate 274 also produces a pulse on the output of inverter 242 which resets decades 236, 238 and 240. Decades 236, 238 and 240 then proceed to count the pulses from decade 234 which occur every 6 seconds. At the end of 30 minutes, less the initial count of divide by six counter 234, outputs B and C of decade 240 go to a logic 1 level, which together with the logic 1 level, on output Q of flip-flop 256 produce a logic 0 level at the output of NAND gate 264. This produces a logic 0 level at the output of NOR gate 276 which is inverted by inverter 278 to provide a logic 1 level which resets flip-flop 256 to the logic 0 state. When the Q output of flip-flop 256 goes back to a logic 1 level, the output of gate 274 goes to a logic 0 level to disable the ring detector 166 after about 30 minutes.

If an incoming ring signal occurs any time during the thirty minute period, the signal is coupled through transformer 162, rectified by diode 170, and applied as a positive voltage on capacitor 178, since diode 177 is back biased. This positive voltage turns transistor 176 on, which turns transistor 182 on, which truns transistor 184 on, thereby latching transistor 182 on for a period of about 20 to 25 seconds, as heretofore described. When transistor 182 turns on, relay coil 156 is energized to close normally open contacts 154. This simulates an off-hook condition which is sensed by the central switching office to stop the ring signal, and also couples the secondary 152 of the line transformer LT to the line. When transistor 184 is switched on by current through transistor 182, transistor 210 is switched off so that the NAND gates 209 and 204 of generators 200 and 202 are enabled. As a result, a busy signal is coupled through resistor 216 and capacitor 218 to the primary winding of line transformer LT and thus is applied to the line and transmitted to the calling party.

The operation of the ring detector and the timed power switch 180 is sufficiently rapid that the contacts 154 are closed to terminate the incoming ring signal prior to any audible ring at the subscriber's set. As a result, the subscriber who would otherwise receive the call is not aware that a call has been placed. If desired, a slight audible tone or an indicator lamp could be provided to indicate an incoming call, although this is not preferred.

The busy signal continues to be applied to the line until such time as a charge on capacitor 188 is sufficient to fire unijunction 194, thus turning transistor 196 on and transistor 184 off. When transistor 184 turns off, transistor 182 is also turned off to deenergize relay coil 156 and thereby reestablish an on-hook condition. Transistor 210 turns on to disable generators 200 and 202.

From the above detailed description of preferred embodiments of the invention, it will be appreciated by those skilled in the art that a unique system for preventing interruptions by telephone calls has been described. In the simpler system, an incoming ring signal produces an audible ring which is detected by the subscriber who responds by either manually or verbally initiating the system which establishes an off-hook condition and transmits a busy signal to the calling party. In the preferred form, the busy signal substantially duplicates the busy signal of the local telephone system to indicate to the calling party that the called station is manned. As a result, the calling party will continue to replace the call, if it is of sufficient importance, until the call is complete. The simple system of FIGS. 1 and 2 is of particular utility in a situation where the subscriber is momentarily busy and cannot effectively answer the call. For example, where an employee is expected to both service customers and answer a telephone, the employee may merely touch the switch, or speak a command, to both establish the off-hook condition which terminates the ring, and initiate the busy signal.

The system of FIGS. 3 and 4 provides electronic detection of the incoming ring signal, followed by automatic establishment of an off-hook condition and transmission of the busy signal. In the preferred form, the off-hook condition is established so rapidly that the central system terminates the incoming ring signal prior to the production of an audible ring. This assures that the subscriber will not be disturbed by the incoming ring signal. By providing a busy signal substantially identical to the busy signal of the local system, the calling party is given the information that the called station is being manned and will undoubtedly replace the call after a suitable passage of time if the call is of sufficient importance. The subscriber can preselect periods of time during which he does not wish to be disturbed. During the selected period, all callers will receive the busy signal. However in all cases, the subscriber's handset can be used in the conventional manner without affecting the operation of the busy signal devices.

Although preferred embodiments of the invention have been described in detail, it is to be understood that various changes, substitutions and alterations can be made therein without departing from the spirit and scope of the invention as defined by the appended claims.

What is claimed is:

1. In a telephone system, the combination of:

first circuit means for connection in parallel with a subscriber's telephone set including normally open first switch means for establishing an off-hook condition when closed, signal means coupled to the telephone line by the first switch means for transmitting a signal indicating that the subscriber is busy over the telephone line, and second circuit means including second switch means responsive to the subscriber for closing the first switch means and thereby initiating the signal means in response to being advised of an incoming ring signal, the second circuit means including timer means for terminating operation of the signal means and opening the first switch means a predetermined period of time after the second switch means is closed to enable the system to respond to a new incoming call.

2. The combination of claim 1 wherein the second switch means comprises a manually actuated switch.

3. The combination of claim 1 wherein the second switch means comprises an audio operated relay.

4. In a telephone system, the combination of:

first circuit means for connection in parallel with a subscriber's telephone set including the secondary of a line transformer and the normally open contacts of a relay, signal generator means connected to drive the primary of the line transformer with a signal indicating that the subscriber is busy in response to an enabling signal, and timer means responsive to the subscriber for selectively closing the contacts of the relay and applying an enabling signal to the signal generator for a predetermined limited period of time whereby the signal indicating that the subscriber is busy will be transmitted over the telephone line for the limited time period only.

5. The combination of claim 4 wherein:

the timer means is responsive to a subscriber manually closing a switch.

6. The combination of claim 4 wherein:

the timer means is responsive to an audible signal from the subscriber.

7. The combination of claim 4 wherein:

the signal generator means generates a signal substantially duplicating a system busy signal.

8. In a telephone system, the combination of:

first circuit means for connection across a telephone line in parallel with a subscriber's telephone set including normally open switch means for establishing an off-hook condition when closed, signal generator means for transmitting a signal to a calling party indicating that the subscriber is busy when the normally open switch means is closed, and ring detector means for detecting an incoming ring signal and closing the normally open switch means in response thereto before an audible signal is produced, and timer means controllable by the subscriber for selectively enabling the ring detector means for at least one predetermined time period.

9. The combination of claim 8 wherein the timer means comprises:

a source of clock pulses, counter means for counting the clock pulses, a plurality of first logic means for detecting a plurality of different counts of the counter means when enabled, second logic means selectively actuatable by the subscriber for enabling one of the first logic means to detect a count of the counter, and circuit means for enabling the ring detector in response to an enabling signal from the second logic means and for disabling the ring detector in response to the detection of the selected count of the counter.

10. In a telephone system, the combination of:

means under the control of a subscriber for responding to a ring signal with an off-hook circuit condition, and means for transmitting a signal to the calling party substantially duplicating a system busy signal after the off-hook circuit condition is established, the means for responding to the ring signal comprising means manually actuatable by a subscriber after being made aware of an incoming ring signal for initiating the busy signal for a predetermined period of time and then automatically resetting so as to receive and announce a new incoming ring signal.

11. In a telephone system, the combination of:

means under the control of a subscriber for responding to a ring signal with an off-hook circuit condition, and means for transmitting a signal to the calling party substantially duplicating a system busy signal for a predetermined limited period after the off-hook condition is established and then automatically terminating the off-hook condition, the means under the control of the subscriber being responsive to an audible signal transmitted by the subscriber.

12. In a telephone system, the combination of:

means connectable in parallel with a subscriber's handset and operable under the control of the subscriber for a first predetermined period of time for automatically responding to an incoming ring signal with an off-hook circuit condition, and means for transmitting a signal to the calling party substantially duplicating a system busy signal for a second predetermined period of time after the off-hook condition is established and then terminating the signal and the off-hook condition.

* * * * *

PO-1050
(5/69)

UNITED STATES PATENT OFFICE
CERTIFICATE OF CORRECTION

Patent No. 3,777,067 Dated Dec. 4, 1973

Inventor(s) Jack S. Kilby

It is certified that error appears in the above-identified patent and that said Letters Patent are hereby corrected as shown below:

Col. 3, line 20, "11" should be --71--.
Col. 5, line 34, "in" should be --on--.

Signed and sealed this 9th day of July 1974.

(SEAL)
Attest:

McCOY M. GIBSON, JR.
Attesting Officer

C. MARSHALL DANN
Commissioner of Patents